US011580811B2

(12) United States Patent
Turnidge et al.

(10) Patent No.: US 11,580,811 B2
(45) Date of Patent: Feb. 14, 2023

(54) FUEL STATION OPERATIONS CONTROLLER AND METHOD TO CONTROL FUEL STATION OPERATION

(71) Applicant: Franklin Fueling Systems, LLC, Madison, WI (US)

(72) Inventors: Martin L. Turnidge, Saco, ME (US); Randall S. Boucher, Saco, ME (US); Vitaliy Demin, Saco, ME (US); Timothy Dyson, South Berwick, ME (US); John J. Gillis, Sebago, ME (US); Adam Main, McFarland, WI (US); George A. Risch, South Portland, ME (US); John Francis Larkin, Greeland, NH (US)

(73) Assignee: Franklin Fueling Systems, LLC, Madison, WI (US)

( * ) Notice: Subject to any disclaimer, the term of this patent is extended or adjusted under 35 U.S.C. 154(b) by 25 days.

(21) Appl. No.: 16/972,189

(22) PCT Filed: Apr. 25, 2019

(86) PCT No.: PCT/US2019/029236
§ 371 (c)(1),
(2) Date: Dec. 4, 2020

(87) PCT Pub. No.: WO2019/236210
PCT Pub. Date: Dec. 12, 2019

(65) Prior Publication Data
US 2021/0327202 A1  Oct. 21, 2021

Related U.S. Application Data

(60) Provisional application No. 62/682,613, filed on Jun. 8, 2018.

(51) Int. Cl.
*G06Q 10/08* (2012.01)
*G07F 9/02* (2006.01)
(Continued)

(52) U.S. Cl.
CPC ........... *G07F 9/026* (2013.01); *G06Q 10/087* (2013.01); *G07F 13/025* (2013.01); *G07F 13/065* (2013.01)

(58) Field of Classification Search
CPC ...... G07F 13/065; G07F 13/06; G07F 13/025; G06Q 10/087; G06Q 20/18; G06Q 20/20; G06Q 10/08
(Continued)

(56) References Cited

U.S. PATENT DOCUMENTS 2,316,338 A     4/1943   Kerr
3,140,012 A * 7/1964   Hansen .................. G07F 13/06
                                               222/642
(Continued)

FOREIGN PATENT DOCUMENTS

CN         201844929     5/2011
EP           2962075     1/2016
(Continued)

OTHER PUBLICATIONS

International Search Report and Written Opinion received for PCT Patent Application No. PCT/US2019/029236, dated Dec. 16, 2019, 17 pages.
(Continued)

*Primary Examiner* — Timothy R Waggoner
(74) *Attorney, Agent, or Firm* — Faegre Drinker Biddle & Reath LLP

(57) ABSTRACT

A fuel station controller to dispense fuel and drinks, a fuel station including the fuel station controller, and a product management subsystem including sensors communicatively
(Continued)

coupled with the fuel station controller. The controller includes a housing comprising product modules having connectors adapted to connect conductors from an ingestible product dispenser, wherein the controller is communicatively coupled with the product modules and comprises processing instructions operable to receive a value indicative of a quantity of an ingestible product in a box to be dispensed by the ingestible product dispenser and to generate an empty box alert if the value is below an empty box setpoint.

17 Claims, 14 Drawing Sheets

(51) Int. Cl.
  *G07F 13/02* (2006.01)
  *G07F 13/06* (2006.01)
  *G06Q 10/087* (2023.01)
(58) Field of Classification Search
  USPC ............... 700/236; 222/64–66; 221/103, 11
  See application file for complete search history.

(56) References Cited

U.S. PATENT DOCUMENTS

| | | | |
|---|---|---|---|
| 4,766,548 A | 8/1988 | Cedrone | |
| 5,208,742 A | 5/1993 | Warn | |
| 6,193,154 B1 | 2/2001 | Phillips et al. | |
| 6,253,610 B1 | 7/2001 | Struzik et al. | |
| 6,360,137 B1 | 3/2002 | Royal et al. | |
| 6,510,736 B1 | 1/2003 | Van | |
| 6,847,305 B1 | 1/2005 | Buck et al. | |
| 6,931,926 B1 | 8/2005 | Van | |
| 7,663,502 B2 | 2/2010 | Breed | |
| 7,724,154 B2 | 5/2010 | Stewart et al. | |
| 9,799,200 B2 | 10/2017 | Chowdhary et al. | |
| 10,535,146 B1* | 1/2020 | Buibas | G06V 20/52 |
| 2002/0148858 A1* | 10/2002 | Bertone | A47J 31/401 |
| | | | 222/129.4 |
| 2005/0060062 A1* | 3/2005 | Walker | G06Q 10/087 |
| | | | 705/400 |
| 2006/0271623 A1 | 11/2006 | Horowitz et al. | |
| 2011/0202413 A1 | 8/2011 | Stewart et al. | |
| 2012/0278454 A1 | 11/2012 | Stewart et al. | |
| 2014/0107835 A1 | 4/2014 | Biasi et al. | |
| 2016/0182144 A1* | 6/2016 | Stout | H01Q 13/06 |
| | | | 455/66.1 |
| 2016/0297666 A1 | 10/2016 | Guy | |
| 2017/0096325 A1 | 4/2017 | Marston et al. | |
| 2017/0337535 A1* | 11/2017 | Jones | H04L 67/10 |
| 2019/0300355 A1* | 10/2019 | Pappas | B67D 1/0022 |
| 2019/0359470 A1* | 11/2019 | Joshi | B67D 1/0871 |

FOREIGN PATENT DOCUMENTS

| | | |
|---|---|---|
| JP | 2003267162 | 9/2003 |
| WO | 2009106902 | 9/2009 |
| WO | 2018049195 | 3/2018 |

OTHER PUBLICATIONS

International Preliminary Report on Patentability for International Application No. PCT/US2019/029236, dated Dec. 8, 2020, 12 pages.
809-DM SeeLeveL Special Truck Gauge, Garnet Technologies, Garnet, garnetinstruments.com, accessed: Feb. 2018.
MultiGauge Link Adapter, PLX Devices, plxdevices.com, Product Code: 897346002931, accessed: Feb. 2018.
Anonymous: "Galvanic Isolation—Wikipedia", Mar. 8, 2018, Retrieved from: https://en.wikipedia.org/w/index.php?title=Galvanic_isolation&oldid=829409161.

* cited by examiner

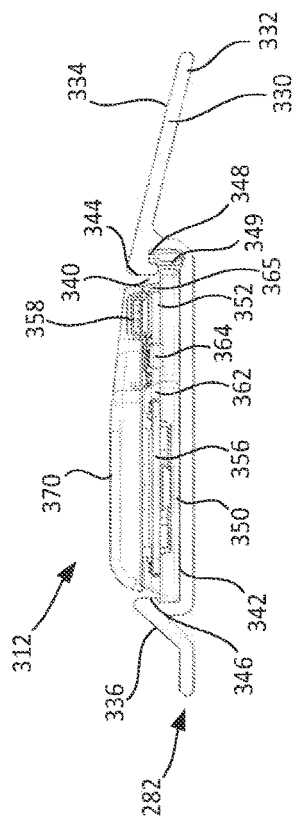
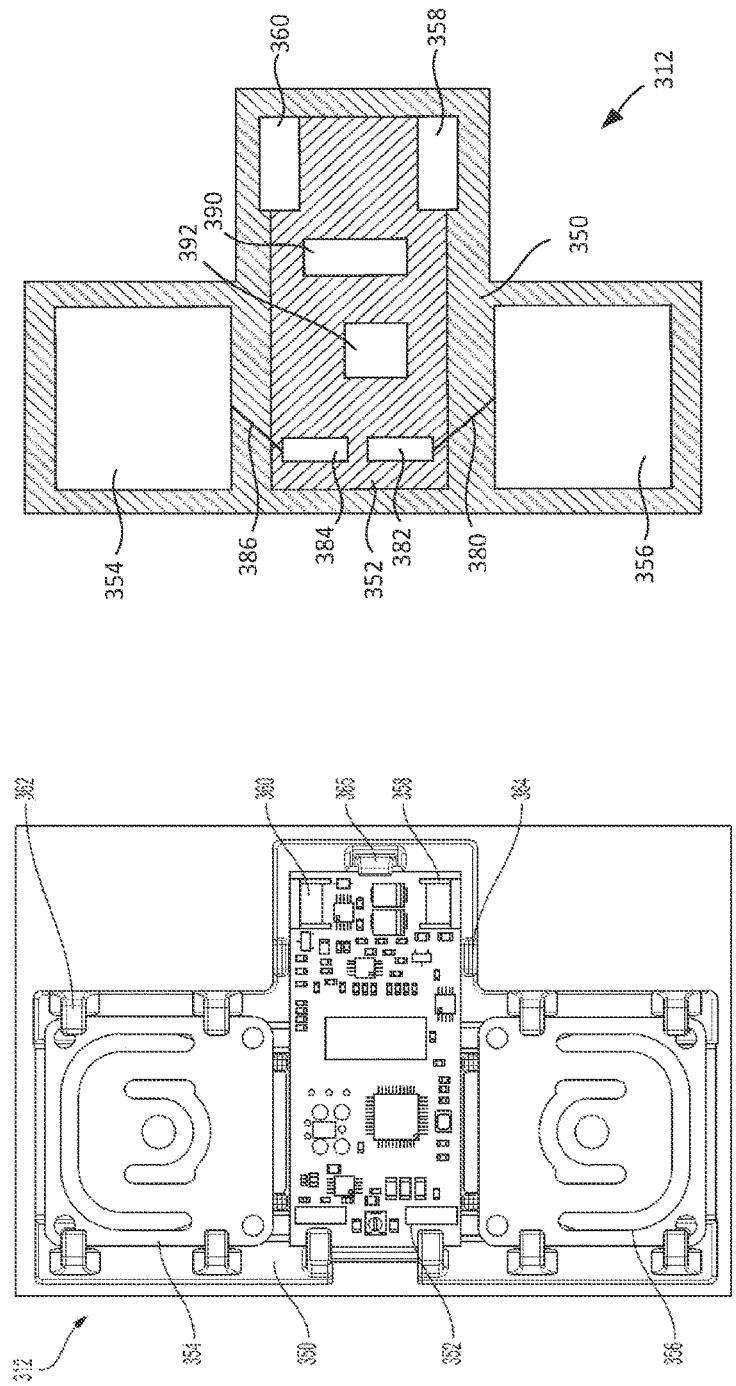

FUEL STATION OPERATIONS CONTROLLER AND METHOD TO CONTROL FUEL STATION OPERATION

CROSS-REFERENCE TO RELATED APPLICATIONS

This application is a National Stage entry under 35 U.S.C. § 317 of International Application No. PCT/US2019/029236, filed on Apr. 25, 2019, which claims the benefit of U.S. Patent Application No. 62/682,613, filed Jun. 8, 2018; the disclosures of said applications are incorporated by reference herein in theirs entirety.

TECHNICAL FIELD

The present disclosure relates to fuel stations, and more particularly to fuel stations including retail stores.

BACKGROUND OF THE DISCLOSURE

Retail fuel stations generally include retail, or convenience, stores in addition to fuel delivery systems. Fuel delivery systems include underground storage tanks for containing fuel of various types and grades, submersible pumps associated with the various tanks for transporting fuel from the tanks through fuel lines to one or more fuel dispensers which function as Point of Sale ("POS") devices for use by consumers, sensors to monitor fuel levels, tank and line pressures, and various other system parameters. Signals from the pumps, dispensers, sensors and other system components are provided to a system controller, which may be connected to various other devices at the fuel stations such as cash registers and displays which operators use to authorize fuel sales. System controllers can monitor the signals and generate alarms when monitored parameters reach certain thresholds.

Convenience stores have increased in size over time and in some instances have become an important contributor to the financial success of the retail fuel sales location. Therefore a need exists to increase the level of customer satisfaction at the convenience store while controlling costs.

SUMMARY OF THE DISCLOSURE

A fuel station controller for a fuel station, and a method of managing ingestible products in the fuel station are provided herein. Also provided herein are a fuel station including the controller and a product management subsystem comprising sensor trays and sensors communicatively connected with the controller.

In one aspect, the disclosure provides a fuel station comprising the fuel station controller. In one embodiment of the present aspect, the fuel station includes fuel storage tanks; a fuel dispenser; fuel pumps structured to pump fuel from the fuel storage tanks though the fuel dispenser; a fuel station controller operable to control the fuel pumps; and a retail store including a sensor configured to generate a signal representative of a quantity of an ingestible product, and a data display, wherein the fuel station controller comprises processing instructions operable to determine a quantity value of the ingestible product based on the signal from the sensor, to determine whether the quantity value is less than a first low level limit or a second low level limit, if the quantity value is less than the first low level limit and an inventory quantity of boxes comprising the ingestible product is less than a minimum quantity, then to initiate a reorder alert, and if the quantity value is less than the second low level limit and the inventory quantity is greater than zero, then to initiate a change box alert.

In another aspect the disclosure provides a fuel station controller with a partitioned enclosure creating first and second volumes, a fuel dispenser controller provided in the first volume and a product controller provided in the second volume. In one embodiment of the present aspect, the fuel station controller operable to control fuel dispensers; and the product controller is operable to monitor ingestible products. In one example of the present embodiment, the product controller comprises processing instructions operable to determine a quantity value of the ingestible product based on a signal from a sensor, to determine whether the quantity value is less than a first low level limit or a second low level limit, if the quantity value is less than the first low level limit and an inventory quantity of boxes comprising the ingestible product is less than a minimum quantity, then to initiate a reorder alert, and if the quantity value is less than the second low level limit and the inventory quantity is greater than zero, then to initiate a change box alert.

In a further aspect the disclosure provides a product controller, sensor trays, and product sensors communicatively coupled to each other and to the product controller. The product sensors are positioned in the sensor trays and communicatively coupled to a product controller. In one embodiment of the present aspect, a fuel station controller has a partitioned enclosure creating first and second volumes, a fuel dispenser controller provided in the first volume and the product controller provided in the second volume. In one example, the product sensors are communicatively coupled to each other and to the product controller. The product sensors can be communicatively coupled to each other in a cabled arrangement and communicatively coupled to the product sensor with the same cabled arrangement or wirelessly. In another example, the product sensors are communicatively coupled to the product controller but not to other product sensors.

In a yet further aspect the disclosure provides a method to manage products using the product sensors to monitor dispensing of the products, the method implemented by a product controller. The product controller receives the values from the sensors representative of quantities of the ingestible products in the boxes. The controller comprises: a housing comprising a partition defining a fueling module space on one side of the partition and a non-fueling module space on an opposite side of the partition, the partition providing electrical isolation between the fueling module space and the non-fueling module space; fueling modules having connectors exposed to the fueling module space, the connectors of the fueling modules adapted to connect conductors from a fuel dispenser; and product modules having connectors exposed to the non-fueling module space, the connectors of the product modules adapted to connect conductors from an ingestible product dispenser, wherein the controller is communicatively coupled with the fueling modules and the product modules and comprises processing instructions operable to receive a value indicative of a quantity of an ingestible product in a box to be dispensed by the ingestible product dispenser and to generate an empty box alert if the value is below an empty box setpoint.

In some embodiments, a fuel station controller is operable to dispense fuel and drinks and comprises: a housing comprising a partition defining a fueling module space on one side of the partition and a non-fueling module space on an opposite side of the partition, the partition providing electrical isolation between the fueling module space and the non-fueling module space; fueling modules having connectors exposed to the fueling module space, the connectors of the fueling modules adapted to connect conductors from a fuel dispenser; and product modules having connectors exposed to the non-fueling module space, the connectors of the product modules adapted to connect conductors from an ingestible product dispenser, wherein the controller is communicatively coupled with the fueling modules and the product modules and comprises processing instructions operable to receive a value indicative of a quantity of an ingestible product in a box to be dispensed by the ingestible product dispenser and to generate an empty box alert if the value is below an empty box setpoint.

In some embodiments, a product management subsystem comprises a box rack; a plurality of sensors configured to generate values indicative of quantities of ingestible products in boxes resting at least partially on respective of the plurality of sensors; and a sensor tray supported by the box rack, the sensor tray accommodating the plurality of sensors, wherein the sensor tray comprises a longitudinal channel adapted to receive the plurality of sensors, each of the plurality of sensors connected to the other of the plurality of sensors by a wired serial communication channel. A fuel station controller is operable to dispense fuel and drinks receives the values from the sensors representative of quantities of the ingestible products in the boxes, the controller comprising: a housing comprising a partition defining a fueling module space on one side of the partition and a non-fueling module space on an opposite side of the partition, the partition providing electrical isolation between the fueling module space and the non-fueling module space; fueling modules having connectors exposed to the fueling module space, the connectors of the fueling modules adapted to connect conductors from a fuel dispenser; and product modules having connectors exposed to the non-fueling module space, the connectors of the product modules adapted to connect conductors from an ingestible product dispenser, wherein the controller is communicatively coupled with the fueling modules and the product modules and comprises processing instructions operable to receive a value indicative of a quantity of an ingestible product in a box to be dispensed by the ingestible product dispenser and to generate an empty box alert if the value is below an empty box setpoint.

BRIEF DESCRIPTION OF THE DRAWINGS

In the drawings, corresponding reference characters indicate corresponding parts throughout the several views. Unless stated otherwise the drawings are not proportional.

FIG. 7 is an elevation view of an example of an embodiment of a weight sensor positioned in a sensor tray;

FIG. 8 is a plan view of the embodiment of the weight sensor of FIG. 7;

FIG. 9 is a block diagram of the embodiment of the weight sensor depicted in FIG. 7;

DETAILED DESCRIPTION

In one aspect of the disclosure a fuel station controller is provided. The fuel station controller is operable to implement a method of managing a convenience store of a fuel station. In another aspect of the disclosure a method of managing a convenience store of a fuel station is provided. In a further aspect, a weight sensor operable to monitor usage of fluids is provided. In a yet further aspect, a sensor tray for the weight sensor is provided. In another aspect, an arrangement comprising a sensor tray and a plurality of weight sensors is provided.

Figure 1:
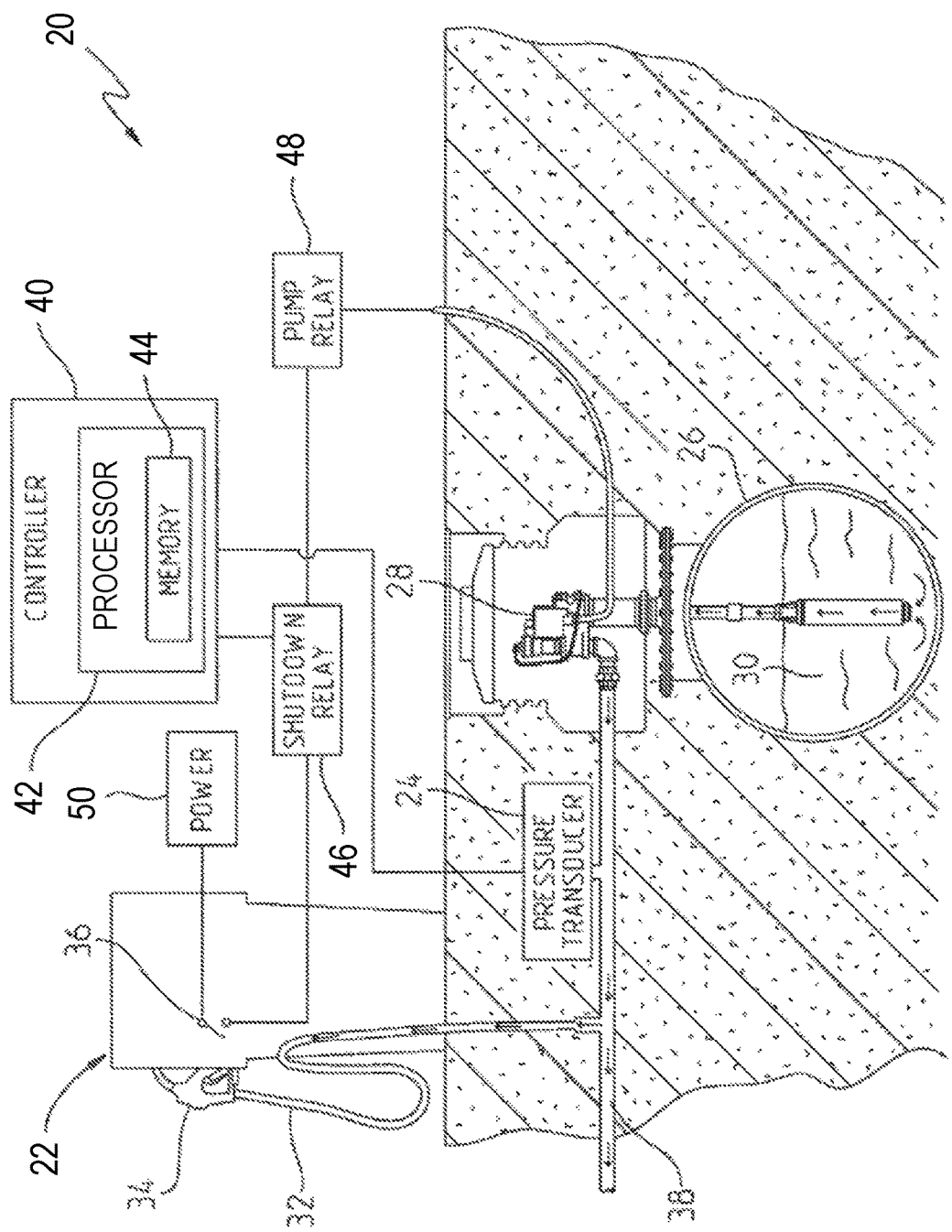
FIG. 1 is a diagrammatic representation of an embodiment of a fuel station.
Figure 2:
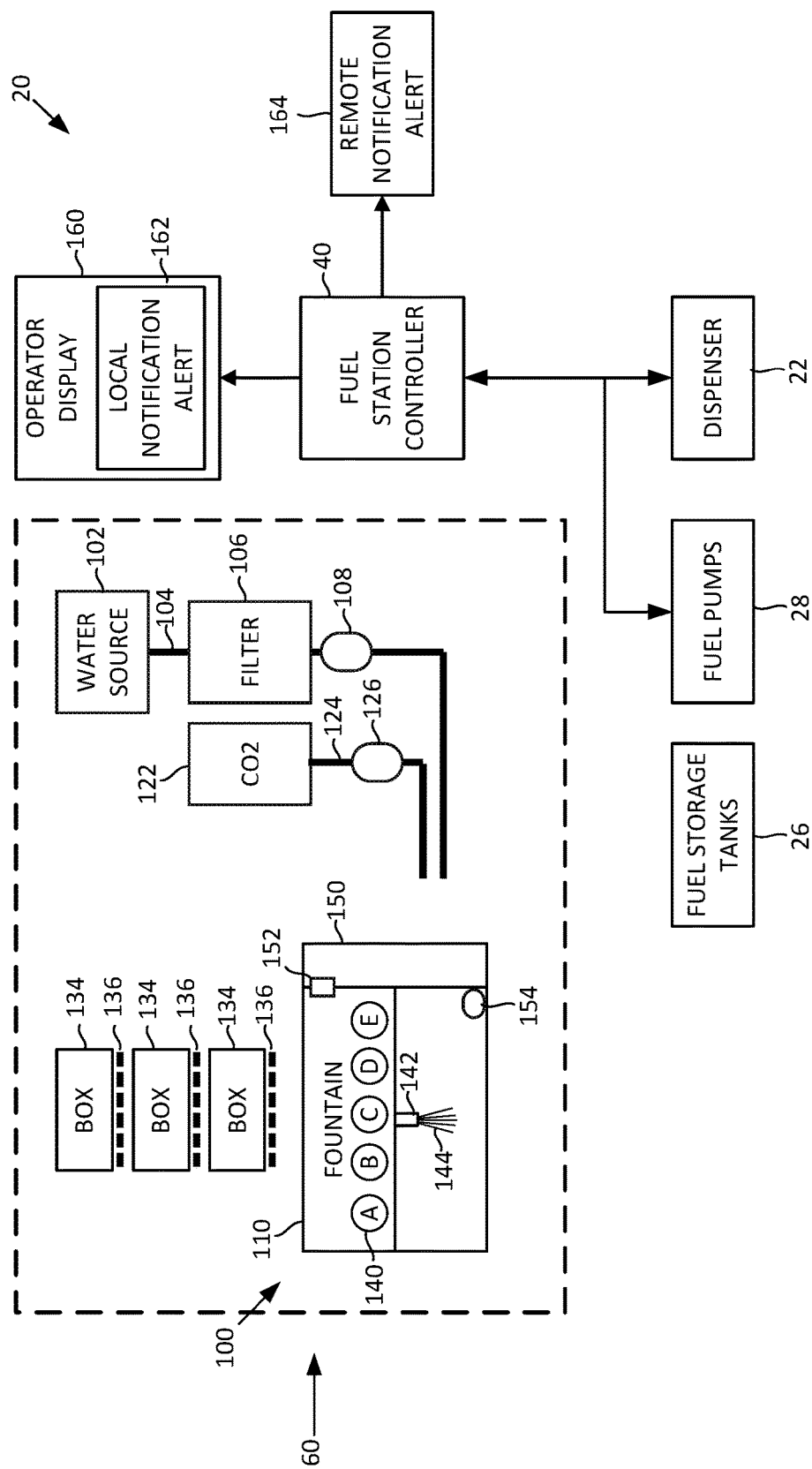
FIG. 2 is a block diagram of an embodiment of a fuel station including an embodiment of a fuel station controller depicted in FIG. 1.

Referring initially to FIGS. 1 and 2, an exemplary fuel station 20 is shown. FIG. 1 depicts the fuel dispensing aspects of fuel station 20 and FIG. 2 depicts in block diagram form certain fuel dispensing components of fuel station 20 and additionally components of a convenience store 60. As depicted in FIG. 1, fuel station 20 includes a fuel dispenser 22 having a hose 32 and a nozzle 34 for dispensing a product, illustratively fuel 30, from a storage tank 26. Storage tank 26 is illustratively positioned underground but may alternatively be positioned above ground. A pump 28 is provided in storage tank 26 to pump fuel 30 through fuel line 38 and out nozzle 34 of fuel dispenser 22 upon request. Fuel line 38 is illustratively an underground pipeline, although other suitable fuel lines may be used.

A switch 36 closes when fuel dispenser 22 requests fuel 30 from storage tank 26. In one embodiment, the removal of nozzle 34 from fuel dispenser 22 closes switch 36. In one embodiment, switch 36 is closed in response to the actuation of a trigger, such as a handle or a lever, on nozzle 34. Closing switch 36 provides power to a pump relay 48 from a power source 50 to turn on pump 28. In one embodiment, power source 50 provides 115 Volts Alternating Current (VAC) to activate pump relay 48. With switch 36 closed, pump 28 displaces fuel 30 from storage tank 26 to fuel dispenser 22 and out nozzle 34. When fueling is complete, switch 36 is opened by returning nozzle 34 to fuel dispenser 22, releasing the trigger on nozzle 34, or by any other suitable input at fuel dispenser 22 that opens switch 36.

A pressure transducer 24 is coupled to fuel line 38 to detect the pressure level in fuel line 38. Pressure transducer 24 may be positioned in any suitable location along fuel line 38 to facilitate pressure detection within fuel line 38. A controller 40 monitors the output of pressure transducer 24 to detect the pressure level in fuel line 38. Controller 40 may determine the presence of a leak in fuel line 38 based on the monitored pressure level in fuel line 38. In the illustrated embodiment, the output of pressure transducer 24 is proportional to the pressure contained in fuel line 38. In one embodiment, pressure transducer 24 provides an analog voltage or current signal to controller 40 that is proportional to the pressure level in fuel line 38.

In one embodiment, controller 40 is an electronic controller and includes a processor 42 and a memory 44. Memory 44 is configured to store data from fuel station 20. Exemplary data stored in memory 44 includes the results of leak tests performed by controller 40 on fuel line 38 and/or on storage tank 26. Memory 44 includes leak detection software modules containing instructions that cause processor 42 to perform a variety of functions, including performing leak tests on fuel station 20, collecting and analyzing data obtained from the tests, and determining a leak test conclusion based on the analyzed data. Exemplary leak tests that may be performed by controller 40 are disclosed in U.S. patent application Ser. No. 14/088,378, filed Nov. 23, 2013, titled METHOD FOR DETECTING A LEAK IN A FUEL DELIVERY SYSTEM, the entire disclosure of which is expressly incorporated by reference herein. Further exemplary leak tests are disclosed in U.S. patent application Ser. No. 13/862,683, filed Apr. 15, 2013, titled METHOD AND APPARATUS FOR CONTINUOUSLY MONITORING INTERSTITIAL REGIONS IN GASOLINE STORAGE FACILITIES AND PIPELINES, the entire disclosure of which is expressly incorporated by reference herein.

An exemplary controller is the TS-550 evo brand Fuel Management System ("EVO controller") available from Franklin Fueling Systems, located at 3760 Marsh Road in Madison, Wis. The EVO controller includes software modules operable to continuously monitor data using statistical functions to detect leaks in the fuel system, to reconcile fuel inventory and auto calibrate fuel levels, to detect fuel line leaks, and to monitor the secondary containment structures in which tanks may be placed. The EVO controller also includes an Ethernet web interface, serial communications interface, USB ports and other communications interfaces to operate the POS and enable remote monitoring. The communications ports can be connected to a computer to enable computer access of certain data and to configure the EVO controller.

Memory 44 may include any of a variety of memory devices suitable for storing data and instructions. As is further described below, data includes a plurality of different variables and parameters relating to components of system 20 as well as historical performance information that may be retrieved using the reporting functions of controller 40. Instructions include an operating system and a plurality of software modules which enable the functions described below. As will be understood by those skilled in the art, instructions may be configured in a variety of suitable programming languages and/or configurations.

Memory 44 includes computer-readable media. Computer-readable media may be any available media that may be accessed by processor 42 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other non-transitory medium which may be used to store the desired information and which may be accessed by processor 42.

In various embodiments, controller 40 may comprise a Linux computer with embedded RAM memory and flash memory storing the software modules. Controller 40 may comprise a Zigbee, Bluetooth, WiFi or other commercially available wireless transceiver. The sensors may use low energy Bluetooth (BLE) processors to conserve energy. The processors and transceivers may be powered by batteries. Transmission protocols may be configured to conserve sensor energy. For example, the BLE processors may be structured to sense changes in a sensed parameter at periodic intervals and to energize the transceiver only when the parameter values change by a predetermined amount, e.g. ½ percent. In this manner the transceiver, which consumes more energy than the BLE processor, is only energized on an event-driven basis, e.g. when needed, instead of at periodic intervals of the same duration. To further conserve energy the wireless sensors may digitize the values and transmit them without performing additional functions based thereon, except for the comparison to determine change.

While controller 40 is depicted in FIG. 1 as a single block, it should be understood that controller 40 includes a plurality of different electronic components configured in circuits to perform the various control and communication functions described below. Controller 40 includes at least one processor 44 which functions as a computing device that receives information and commands, processes such information and commands, and outputs information and commands to other components of system 20. Controller 40 may also include (not shown) a communications processor to operate various communication interfaces, and a video processor to operate displays. A BLE processor is an example of a communications processor.

FIG. 2 depicts in block diagram form certain fuel dispensing components of fuel station 20 and additionally components of a convenience store 60 including a fountain system 100. Fountain system 100 includes a water source 102 fluidly coupled by a water line 104 to a filter 106 and a pressure sensor 108 operable to determine the pressure in water line 104. Water line 104 delivers filtered water to a fountain dispenser 110. Fountain system 100 also includes a carbon dioxide (CO2) container 122 fluidly coupled by a CO2 line 124 to a pressure sensor 126 operable to determine the pressure in CO2 line 124. CO2 line 124 delivers CO2 to fountain dispenser 110. Fountain system 100 also includes a plurality of liquids contained in bags within boxes 134 and associated sensors 136 operable to determine the amount of liquid in each of boxes 134. Examples of sensors 136 include strain cells to determine weight, and level sensors providing signals indicative of the level of the liquid in the box. The level or weight can then be correlated to an amount of liquid in the box. The amount of liquid, the weight, or the level can be used to determine when the box should be replaced or to check inventory and reorder boxes with sufficient lead time to ensure a replacement box is available when the level of the box is low enough to warrant replacement, thereby ensuring that respective liquids, e.g. flavored syrup, are always available to satisfy customers. In some embodiments, some of which are discussed with reference to FIG. 3, the sensors of fountain system 100 are wirelessly communicatively coupled to controller 40. In one example, when a box is 50% full the system controller checks availability of a replacement box and if none is on inventory, the controller issues a reorder notification. While a liquid digestible product in a box has been described above, it should be understood that any product can be measured, whether packaged in a box or another package format, whether it is a liquid or a solid product. For example, the foregoing method and system can be used to measure individual items in a box of items, and granular products packaged in any suitable manner.

In some embodiments, fountain dispenser 110 includes a plurality of flavor selectors 140 and one or more dispensing nozzles 142 and associated valves (not shown) operable to dispense a liquid comprising a carbonated flavored syrup and water combination, otherwise referred to as a fountain drink. In other embodiments, fountain dispenser 110 includes flavor selectors 140 and one or more dispensing nozzles 142 and associated valves operable to dispense an ice and flavored syrup combination, otherwise referred to as a slushy drink. Fountain dispenser 110 may thus comprise an ice machine (not shown) to provide ice, and a cooler including a door 150 and associated door sensors 152 and temperature sensors 154, which are operable to monitor closure of door 150 and the temperature of the cooler.

An operator display 160 is also shown. Controller 40, also depicted as fuel station controller 40, includes a software module operable to monitor the various parameters of fuel station 20 and generate a local notification alert 162 and a remote notification alert 164 transmitted over a network to a remote monitor. Generally, the network may be a local area network coupled to a wide area network or a wide area network. Controller 40 may operate as a workstation in the network, capable of stand-alone operation so that fuel station 20 may operate the convenience store in some cases even if the network is temporarily inoperable, and also to perform terminal functions.

The terms "network," "local area network," "LAN," "wide area network," or "WAN" mean a connection infrastructure wherein two or more computing devices are connected in such a manner that messages may be transmitted between the devices. In such networks, typically one or more computing devices operate as a "server," a computer with large storage devices such as hard disk drives and communication hardware to operate peripheral devices such as printers or modems. Other devices, termed "workstations," provide a user interface so that users of networks can access the network resources, such as shared data files, common peripheral devices, and inter-workstation communication. The computing devices typically have at least one processor for executing machine instructions, and memory for storing instructions and other information. Many combinations of processing circuitry and information storing equipment are known by those of ordinary skill in these arts. A processor may be a microprocessor, a digital signal processor ("DSP"), a central processing unit ("CPU"), or other circuit or equivalent capable of interpreting instructions or performing logical actions on information. Memory includes both volatile and non-volatile memory, including temporary and cache, in electronic, magnetic, optical, printed, or other format used to store information.

In some embodiments, a fuel station comprises fuel storage tanks; a fuel dispenser; fuel pumps structured to pump fuel from the fuel storage tanks though the fuel dispenser; a fuel station controller operable to control the fuel pumps; and a retail store including a sensor configured to generate a signal representative of a quantity of an ingestible liquid product held in a box; and a data display. The fuel station controller comprises processing instructions operable to determine a quantity value of the ingestible liquid product based on the signal from the sensor, to determine whether the quantity value is less than a first low level limit or a second low level limit, if the quantity value is less than the first low level limit and an inventory quantity of boxes comprising the ingestible liquid product is less than a minimum quantity, then to initiate a reorder alert, and if the quantity value is less than the second low level limit and the inventory quantity is greater than zero, then to initiate a change box alert.

In some variations of the present embodiment, the change box alert comprises a local notification alert presented on the data display. In some examples, the reorder alert comprises a local notification alert presented on a display located at the store. In other examples, the reorder alert comprises a remote notification alert adapted to be received outside the fuel station. The remote notification alert may be transmitted to a supplier of the liquid product or to a remote controller associated with the fueling station.

In some variations of the present embodiment, the fuel station controller is programmable with the first low level limit and the second low level limit. In some examples, the fuel station controller processing instructions are operable to automatically program the first low level limit and the second low level limit dynamically based on a time of day and a day of week. The processing instructions may be operable to automatically program (as described below) the first low level limit dynamically based on the time of day, the day of week, and a usage history. The fuel station controller may retain historical usage information and determine, for example, that daily usage is 0.5 gallons of a particular liquid, and that based on a volume of 5.0 gallons of liquid in a box (a 10 day supply), and a one-day delivery time if the box is ordered by 4 p.m. on a week-day, the fuel station controller may determine that the first low level limit is 1 gallon before 4 p.m. or 1.5 gallons after 4 p.m., allowing for usage variation and flexibility in the delivery and restocking of the new box. The amount of safety volume may be programmed by the operator or a remote controller to balance drink availability (prevent outages) to the customer and minimize inventories. Daily usage may be determined as the average usage for the particular liquid and may be adjusted based on, for example, running promotions, weather forecast, and scheduled events that historically increased usage. For example, sales of slushy drinks may be known to increase in hot weather or weekends in which outdoor concerts are scheduled. Similarly, the fuel station controller may determine that the runout date for a liquid falls on a Saturday, Sunday, or Monday, then may issue a reorder instruction on the previous Thursday for Friday delivery so as to prevent outages in instances where deliveries of liquids occur only on weekdays. Additionally, the fuel station controller may use the daily usage, or run-rate, to predict a time-to-empty expectation and set the second low level limit accordingly. Boxes may come in 2.5 gallons, 3.0 gallons, 5.0 gallons, and other sizes.

In some embodiments, the fuel station controller automatically detects a sudden and sustained increase in the box signal to determine that a box has been replaced. The fuel station controller may calibrate the signal to represent a known volume of liquid in a box. A sudden increase may comprise a step-change increase in the signal. A sustained increase may be a few minutes. Thus if the signal increases quickly (in milliseconds range) and is maintained at the higher level for several minutes or more, then the fuel station controller determines that a box has been replaced. The fuel station controller may also monitor the signal to detect decreases corresponding to servings, to confirm that the sudden increased signal represents a box replacement. Of course if the increased signal is outside a range or above a high limit, the fuel station controller may send a signal to indicate that there is unexpected weight or volume variation in the particular box, which may be due to the box not being positioned properly on a sensor or perhaps additional weight was placed on the box.

Each box may have a detectable sign or indicator. The fuel station may include a sensor to detect the sign or indicator, and the fuel station controller may use the sign or indicator signal to increase local inventory values when a box is added to inventory, evidenced by detection of the sign or indicator. The operator may manually increase inventory based on deliveries. The indicator may be an RFID circuit. The detectable sign may be a barcode printed on the box or a label attached to the box.

Figure 3:
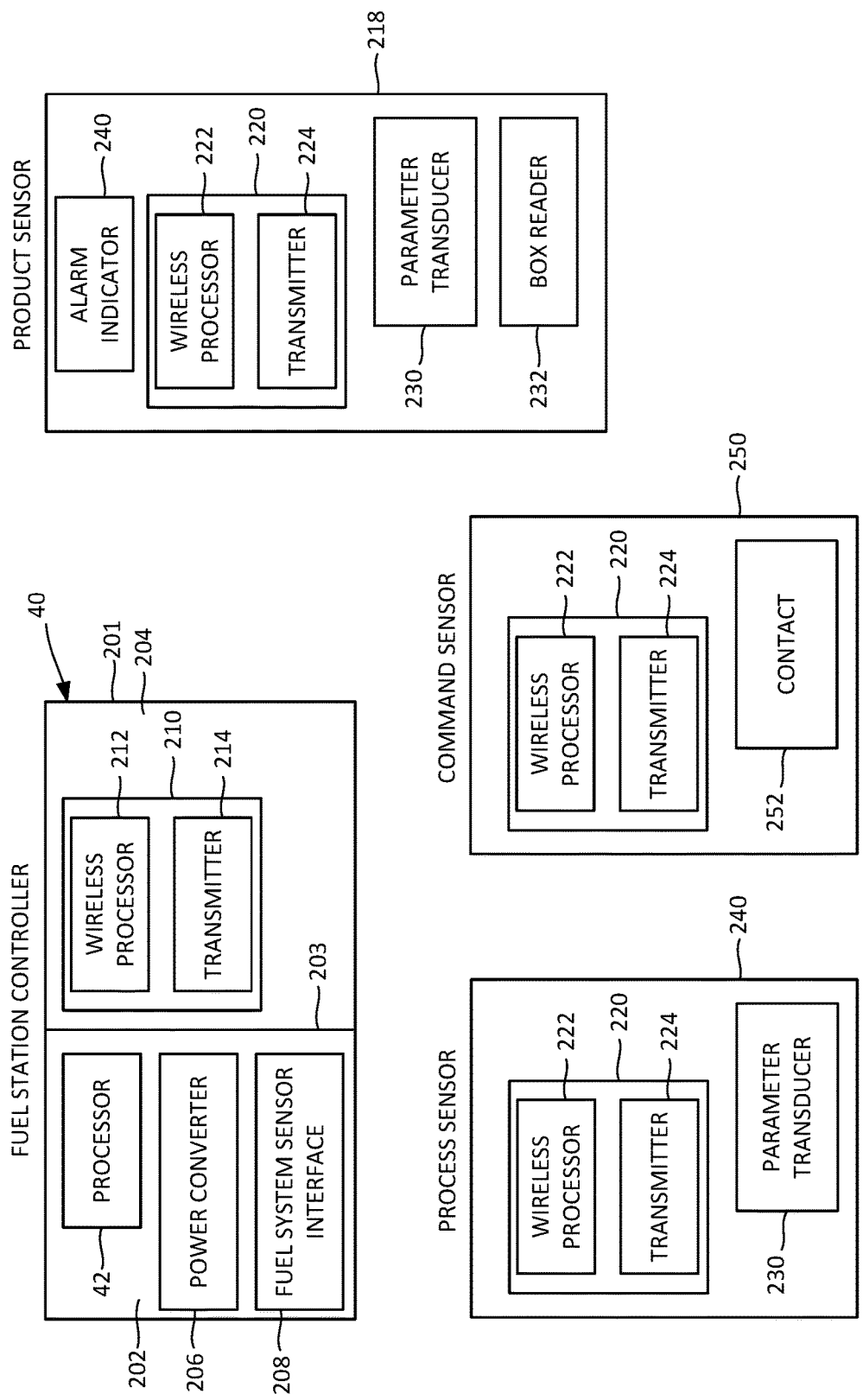
FIG. 3 is a block diagram of an example of the embodiment of the fuel station controller depicted in FIG. 2 and a wireless sensor operable with the fuel station controller.

Referring to FIG. 3, in some variations controller 40 comprises a mixed security controller with a partitioned housing 201 in which a safe section 202 of the controller is separated from a non-fueling section 204 by a partition 203. The safe section includes fueling sensor inputs and meets U.S. Environmental Protection Agency (EPA) requirements. The non-fueling section receives data from the various retail store sensors. Advantageously, adding a non-fueling section to a controller that is EPA certified, without modifying the safe section, does not require re-certification. This enables the user to expand the utility of fuel station controller 40 without replacing it. The data received in the non-fueling section may be received by wireless or wired communications channels.

As shown, safe section 202 includes a power converter 206 to convert AC power to various DC levels needed to power processor 42 and a fuel system sensor interface 208 configured to receive signals from the fueling system. Non-fueling section 204 includes a wireless transceiver 210, which may comprise a wireless processor 202 and a transceiver 214. In one example, wireless processor 212 and a transceiver 214 are integrated into a single-piece wireless transceiver 210. Wirelessly coupled to transceiver 210 is a transceiver 220 of a product sensor 218 comprising a wireless processor 222 and a transceiver 224. In one example, wireless processor 222 and a transceiver 224 are integrated into single-piece wireless transceiver 220. Additionally, product sensor 218 includes one or both of a parameter transducer 230 to sense a parameter indicative of the amount of liquid in the box and a box reader 232. Box reader 232 may be a scanner or RFID reader, for example.

In operation, parameter transducer 230 and box reader 232 communicate with wireless processor 222 which determines whether to transmit the values of the signals output by parameter transducer 230 and box reader 232. If an event occurs that warrants transmission, wireless processor 222 commands via a signal line to transceiver 224 to power-up and transmit the values. Thereafter transceiver 224 powers-down and wireless processor 222 enters the low energy mode to conserve energy. Wireless processor 222 may wake-up periodically to sense the parameter and determine whether it needs to be transmitted. Similarly, box reader 232 is instructed by wireless processor 222 to read a box after controller 40 determines that a new box has been placed in the designated location adjacent box reader 232. Wireless processor 222 may receive an indication from processor 42 via wireless processor 212 and transceiver 214 that the change in the parameter value indicates that a new box has been placed in the designated location, which is an event that causes to box reader 232 to read the box. After doing so wireless processor 222 causes transceiver 224 to send the information to transceiver 212. Processor 42 receives the information and determines whether the box has the correct contents, and uses the size of the box in future calculations of run-rate etc. The box sensors, for example product sensor 218, may include alarm indicators 240, such as lights or sound generators. Lights may comprise light emitting diodes of various colors or programmed to flash in different patterns to convey information. Controller 40 may command alarm indicators 240 to indicate one or more alarms, as described elsewhere herein.

In a variation of the present embodiment, box reader 232 may be commanded to read the box periodically and controller 40 may compare the received information to determine that a box has been changed, instead of relying on the information relating to the quantity of liquid in the box.

In a variation of the present embodiment, controller 40 includes the safe section and a separate controller includes the non-fueling section. The disclosed methods of operating the convenience store are programmed in the controller of the safe section, and the non-fueling section communicates values from the various convenience store wireless sensors to controller 40. Of course the non-fueling controller could operate the convenience store sensors but that would increase the overall hardware cost of the fuel station control system.

Also shown in FIG. 3 are a process sensor 240 and a command sensor 250. Process sensor 240 may be used to measure pressures and temperatures, thus functioning as sensors 108, 126, 152, or 154. Command sensor 250 is similar to process sensor 240 except that it is used to detect when an operator presses a button, activates a switch, or otherwise uses a circuit component to issue a command. In some embodiments, command sensor 250 is positioned adjacent an outdoor garbage container. The operator can use command sensor 250 to send a signal to controller 40 which controller 40 interprets as an instruction to contact the garbage collector to change containers. The operator might issue the command when the garbage container is full. Doing so saves costs or reduces garbage accumulation because the garbage collector exchanges containers on command instead of doing so on a regular schedule. The regular schedule might not be frequent enough in some instances and too frequent in others. Command sensor 250 may include a contact from a push-button, toggle switch, or any other binary circuit.

In some embodiments, a fuel station comprises fuel storage tanks; a fuel dispenser; fuel pumps structured to pump fuel from the fuel storage tanks though the fuel dispenser; a fuel station controller operable to control the fuel pumps; and a retail store including an ingestible liquid product held in a box; a box sensor configured to generate signals representative of box information of the box, the box information including an expiration date. The fuel station controller comprises processing instructions operable to issue a replacement command when a current date is within a predetermined number of days from the expiration date. In this manner the fuel station controller ensures that the liquid is fresh when it is delivered to the fountain dispenser. The predetermined number of days includes zero days, meaning that the box should be replaced on its expiration date, or may be more days, for example if the replacement command is intended to trigger a reorder alert or to allow for the possibility that the box needs to be reordered.

In one variation, the processing instructions are further configured to track boxes replaced due to their expiration dates. Tracking boxes in this manner, for example by calculating a cumulative value representing wastage, may suggest to the operator to change flavors to limit wastage.

In some variations of the present embodiment, the processing instructions are further configured to select from at least two boxes in inventory the box with the shortest time to the expiration date. The expiration date may be read from the box when the box is delivered to the convenience store or may be transmitted electronically as part of the delivery system. In one example, the controller receives box delivery information electronically from the supply system and generates labels with barcodes for each box. The labels are placed by the operator on the box in a location corresponding to the placement of the box sensors on the shelves where the boxes are placed in use.

In some embodiments, a fuel station comprises fuel storage tanks; a fuel dispenser; fuel pumps structured to pump fuel from the fuel storage tanks though the fuel dispenser; a fuel station controller operable to control the fuel pumps; a retail store; and a command sensor configured to generate a user command signal. The fuel station controller comprises processing instructions operable to issue a garbage container replacement command upon receipt of the user command signal. In this manner the fuel station controller ensures that garbage containers are replaced when full, avoiding the cost of replacing partially full containers or of having overflowing containers. In one variation, the processing instructions are further configured to, upon receipt of the user command signal, compare a current date to a scheduled pickup date and only issue the garbage container replacement command if the difference between the scheduled pickup date and the current date exceeds a threshold number of days. In this manner scheduled pickups provide some efficiency and the replacement command overrides the scheduled pickup only on an exception basis.

In some embodiments, a fuel station comprises fuel storage tanks; a fuel dispenser; fuel pumps structured to pump fuel from the fuel storage tanks though the fuel dispenser; a fuel station controller operable to control the fuel pumps; and a retail store including a beverage dispenser and a valve. The valve fluidly connects two boxes containing syrup to the beverage dispenser. The valve is controlled by the fuel station controller. The fuel station controller comprises processing instructions operable to prevent operation of the beverage dispenser upon determining that the box currently connected to the beverage dispenser is empty, to prevent damaging the beverage dispenser. If the beverage dispenser is capable of dispensing beverages, such as frozen carbonated beverages (FCB), with a flavor selectable from a plurality of flavors, only dispensing of the beverage with syrup from the empty box is prevented. In one variation, the processing instructions are further configured to determine when the connected box is empty and to operate the valve to fluidly connect the other of the two boxes to the beverage dispenser so that the drink with the desired flavor can be served while the empty box is changed. A relay may be used to connect the controller to the dispenser to prevent the dispenser from serving the respective beverage. The controller may also issue an alarm to initiate replacement of the empty box, as previously described. The controller may determine that a box is empty based on the second low level limit described previously, wherein the controller compares a weight, level or other characteristic representative of amount to a programmed or dynamically determined limit indicative of an amount of liquid small enough to warrant changing the box.

The fuel station controller may be communicatively coupled to a materials requirement procurement (MRP) system via the network. The MRP system may track box movements from warehouses to fuel stations and also between fuel stations. For example, fuel stations of a fuel station chain may be able to transfer boxes to meet local needs. The remote notification from the fuel station controller would automatically notify the MRP system that a box is needed, and the MRP system would then make available a box based on the urgency of the request and the availability of boxes in warehouses or other fuel stations.

The fuel station controller may also track long restocking periods. For example, the time a flavor is unavailable because an empty box has not been replaced directly affects profits and may be used as a measure of performance for the fuel station. The performance measure may be used to indicate that training is needed in terms of restocking or perhaps system maintenance. The long restock time may be an average or cumulative value across the convenience store and may be weighed by the run-rate of each product so that unavailability of popular flavors is weighed higher than less popular ones, to reflect the impact on customer satisfaction.

In some embodiments, a fuel station comprises fuel storage tanks; a fuel dispenser; fuel pumps structured to pump fuel from the fuel storage tanks though the fuel dispenser; a fuel station controller operable to control the fuel pumps; and a retail store including a beverage dispenser. The fuel station controller comprises processing instructions operable monitor the pattern of dispensing and post a warning when the pattern is not similar to recent dispense profiles. Recent dispense histories can be summarized by calculating statistical parameters representative of the profiles, e.g. average and standard deviation, or by correlating a model dispense history to a present dispense pattern and determining a correlation value between them. Variations from dispense histories might be indicative of damaged boxes or system failures ($CO_2$ out, valve closed, etc) before there is an impact on the customer. In one variation, an operator is presented with an option to discard the abnormal profile or to permit the profile to be included in future calculations of dispense histories.

In one variation, a daily usage for a given product is determined and an alert is provided when daily usage is outside a historical mean +/− N standard deviations. N may be selected by the operator and may be in the range of 1-4, for example. The alert would be indicative of a slow moving product, changes in customer habits, etc.

Figure 4:
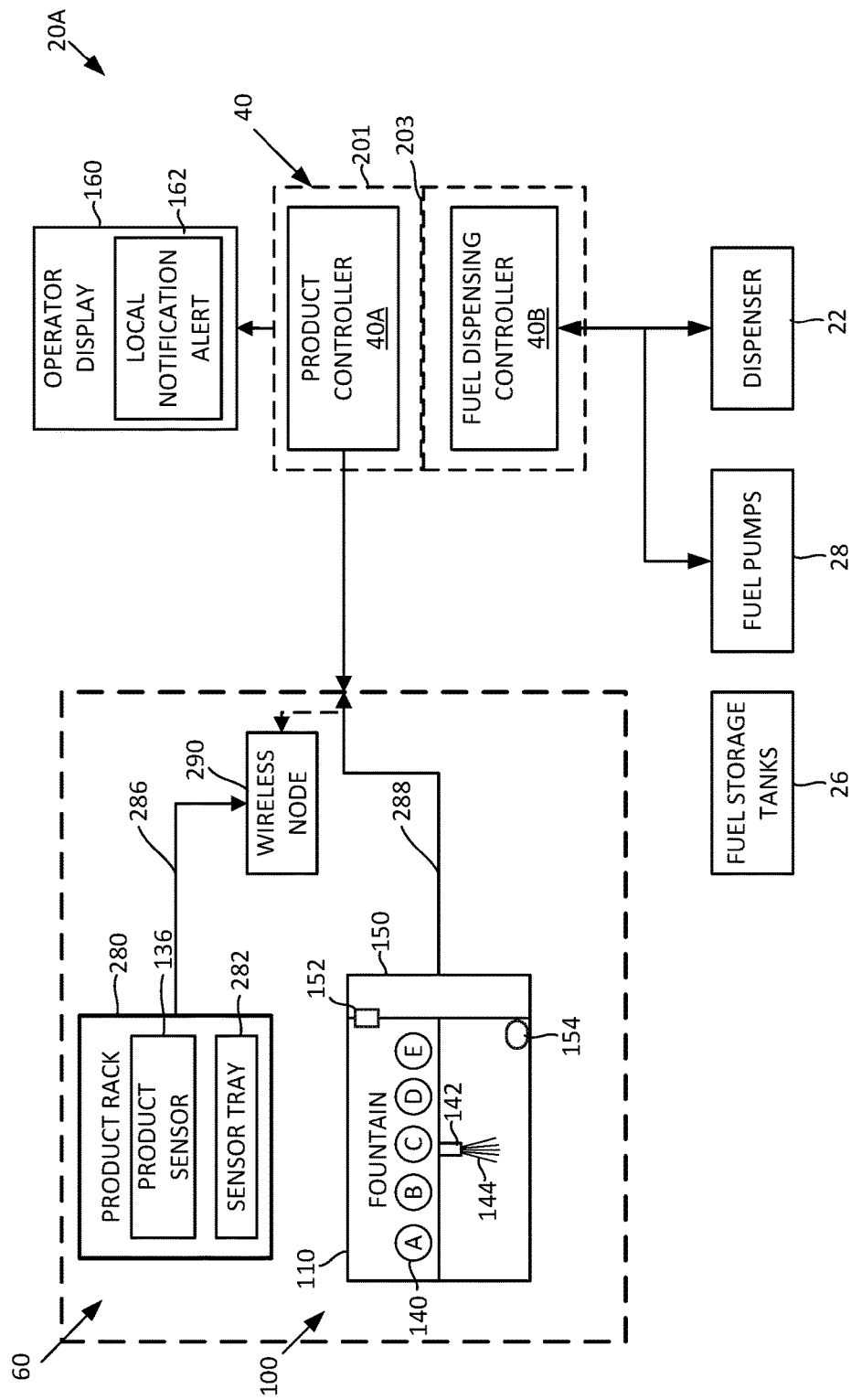
FIG. 4 is a block diagram of an example of the embodiment of the fuel station depicted in FIG. 2.
Figure 5:
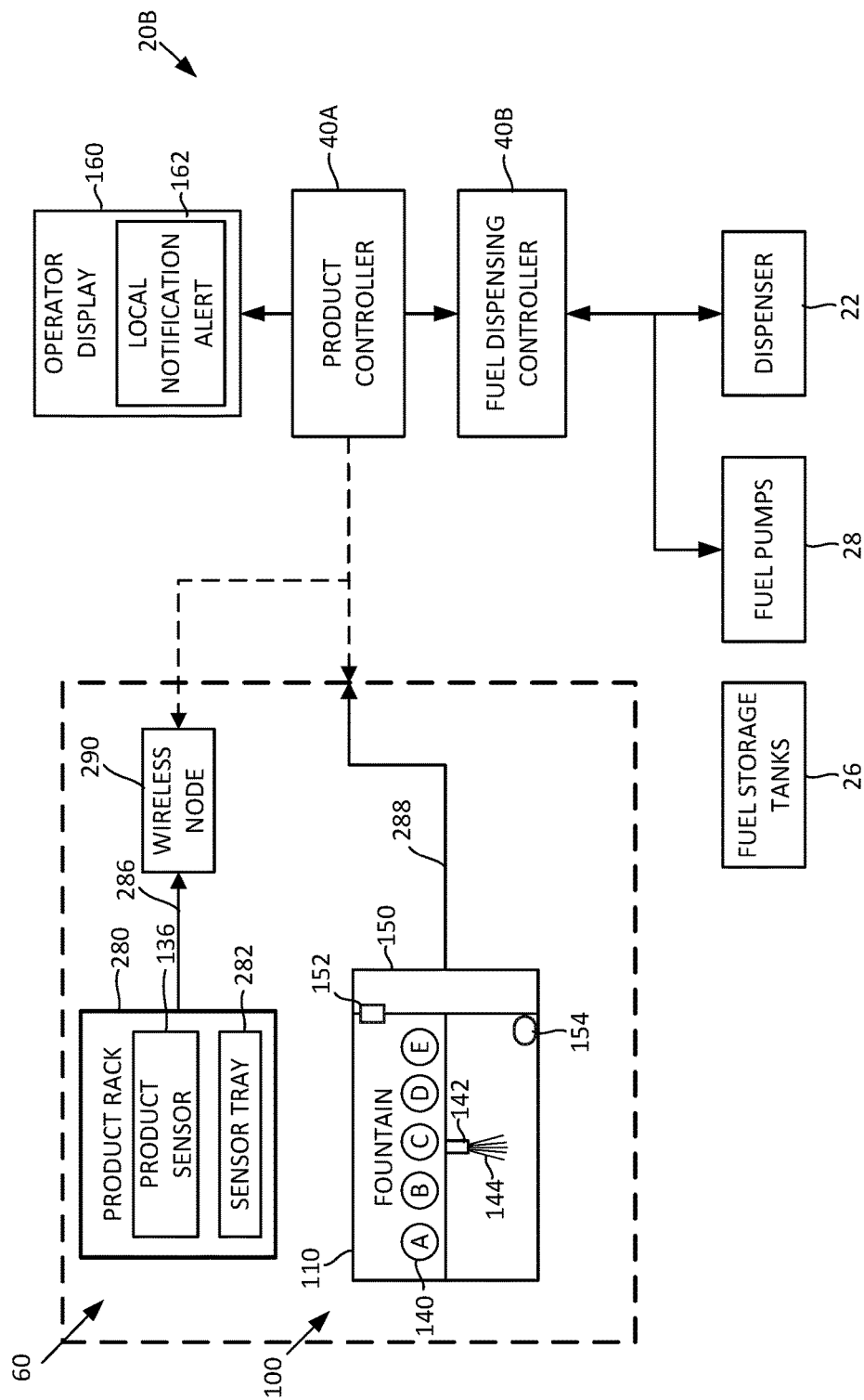
FIG. 5 is a block diagram of another example of the embodiment of the fuel station depicted in FIG. 2.

FIGS. 4 and 5 are block diagrams of examples of the embodiment of the fuel station depicted in FIG. 2. FIG. 4 depicts convenience store 60 having fountain system 100, and an example of a product rack 280 including product sensors, e.g. weight sensors 136 and sensor trays 282. Sensor trays 282 can be extruded, formed, or machined from materials including, for example, polymers and aluminum. In the present embodiment, fuel station controller 40 comprises partitioned housing 201 with a product controller 40A and a fuel dispensing controller 40B separated by partition 203. Thus, while a single controller may perform the fuel dispensing and convenience store product management functions described herein, two or more controllers may be used. Communications channels 286 and 288 communicatively couple, respectively, product sensors 136 and fountain system 100, to product controller 40A. Communication channel 286 may comprise a wired channel connecting product sensors 136 to product controller 40A via a serial communications protocol. Communication channel 286 may comprise a wired channel connecting product sensors 136 to each other and to a wireless node 290, and a wireless channel between wireless node 290 and product controller 40A. Wireless node 290 would then comprise a serial communications controller programmed to poll the sensors, obtain the data, and communicate the data, and a wireless controller programmed to receive the data and to transmit it wirelessly to product controller 40A. Use of a wireless node simplifies connectivity between the product racks and the product controller by eliminating a portion of the wired channel, but requires that the product controller include or have access to a wireless transmitter. Use of a wired-only communications channel requires a serial communications controller in the product controller. In cases where the product controller does not have space, e.g. a rack slot, to add a serial communications controller, substitution of a processor with a wireless processor may provide the communications channel without upgrading the product controller or the fuel station controller. As used herein, "product" refers to products dispensed within the convenience store, specifically excluding fuel.

In some embodiments, fuel station controller 40 comprises partitioned housing 201. Product sensors 136 may be communicatively coupled to controller 40 in any manner, including wirelessly, wired, or a combination of wirelessly, wired as described above. Product sensors 136, 312 may be supported in a tray or by any structure that supports a box without using a sensor tray, e.g. transverse supports 304 shown in FIG. 6.

Figure 4A:
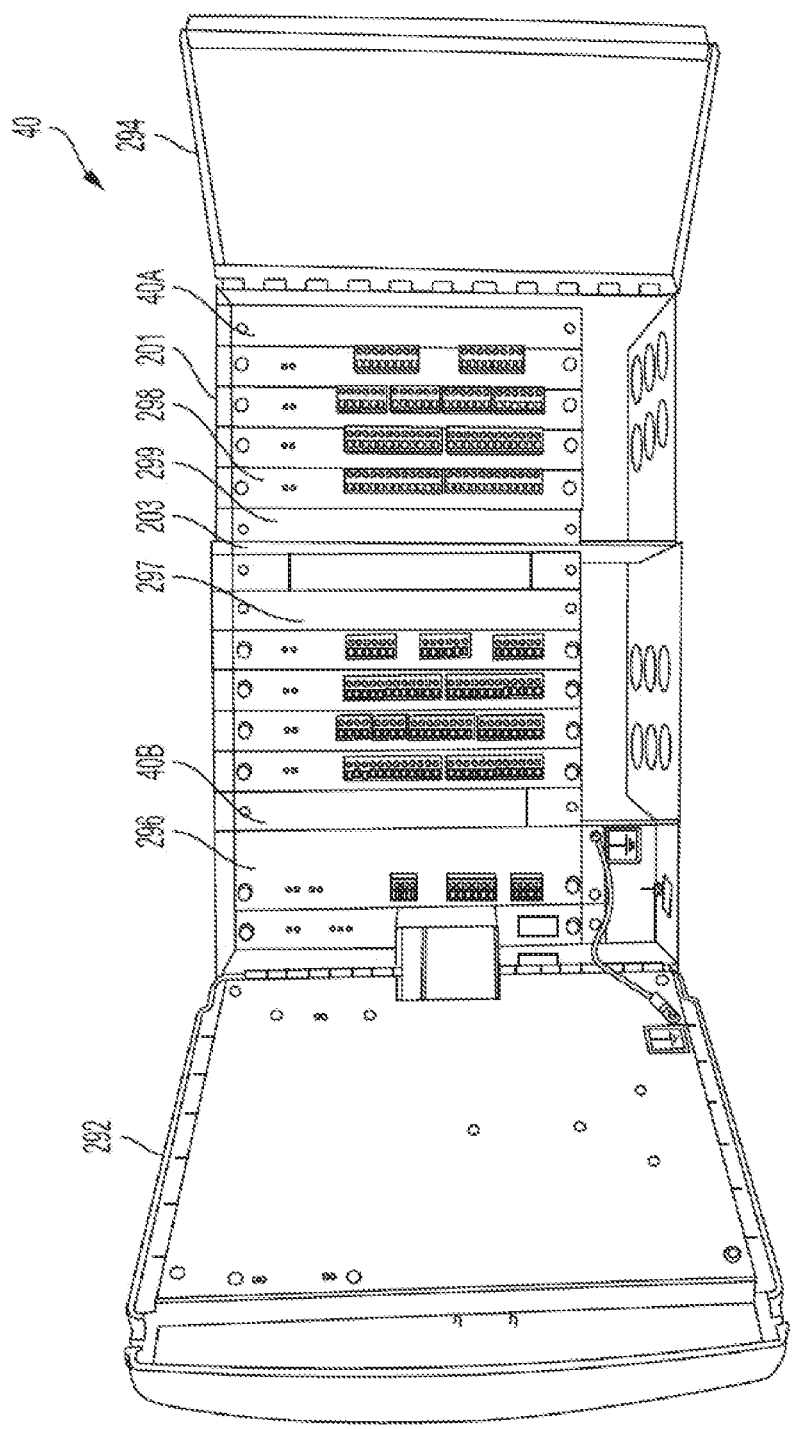
FIG. 4A is a perspective view of product controller with a partitioned housing.

FIG. 4A is a perspective view of product controller 40 showing partitioned housing 201 and partition 203 defining a fueling module space 297 on one side of the partition and a non-fueling module space 299 on an opposite side of the partition, the partition providing electrical isolation between the fueling module space and the non-fueling module space. Fueling modules 296 having connectors exposed to fueling module space 297 are adapted to connect conductors from a fuel dispenser. Product modules 298 having connectors exposed to the non-fueling module space 299 are adapted to connect conductors from an ingestible product dispenser. Controller 40 is communicatively coupled with the fueling modules and the product modules and comprises processing instructions operable to perform the methods described with reference to FIGS. 13-16. In the present embodiment, a hinged door 292 encloses the fueling module space 297 and a hinged door 294 encloses the product module space 299. Partition 203 prevents any electrical conductor to extend between the fueling and non-fueling/product spaces. Although described in the context of a single controller 40, in some embodiments controller 40A is provided to operate with the non-fueling modules and controller 40B is provided to operate with the fueling modules.

FIG. 5 depicts another example of convenience store 60, similar to the example depicted in FIG. 4, in which product controller 40A and fuel dispensing controller 40B are provided in separate housings instead of being combined in a partitioned housing.

Figure 6:
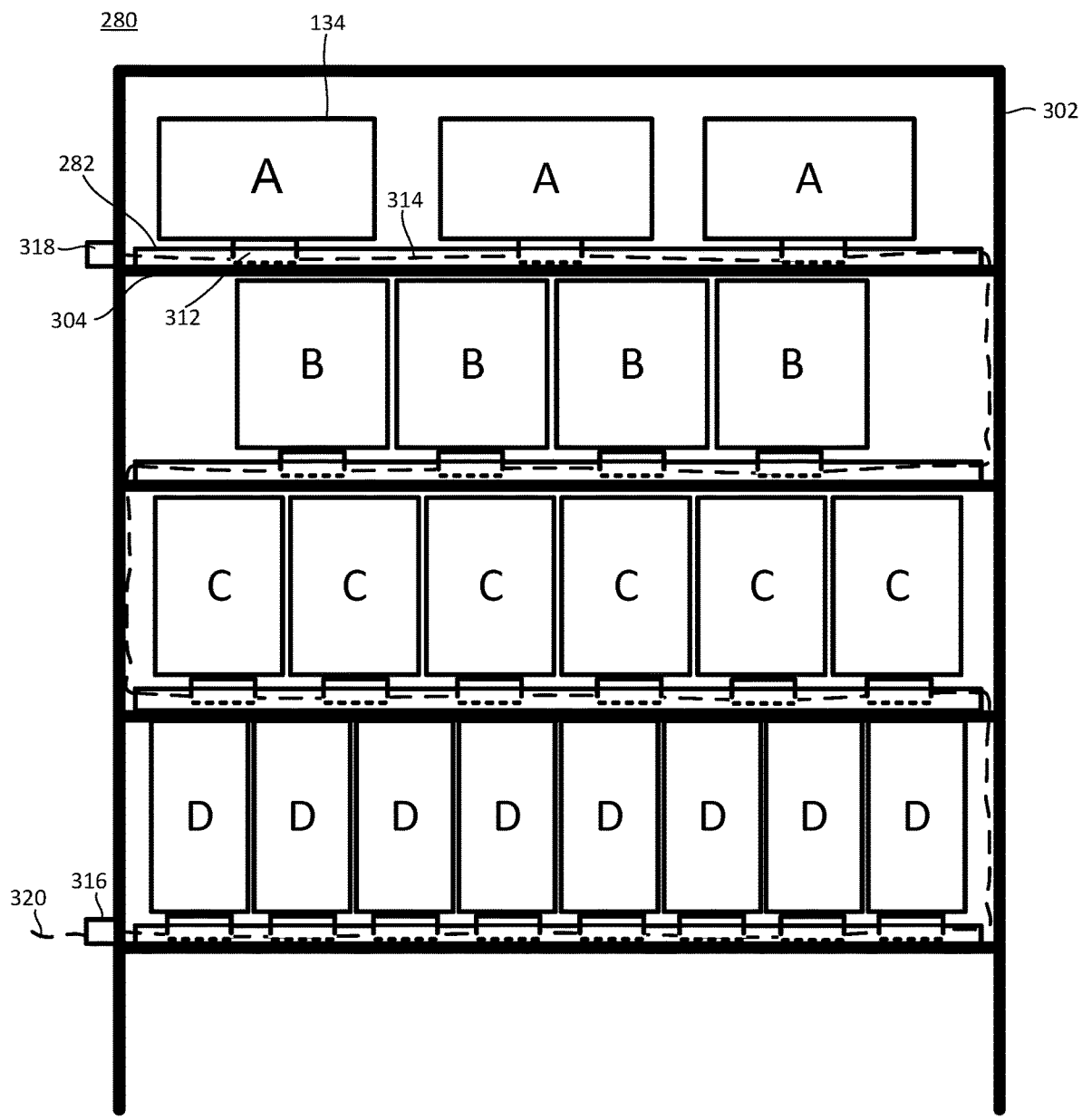
FIG. 6 is a schematic diagram of an embodiment of the product rack depicted in FIG. 4.
Figure 10:
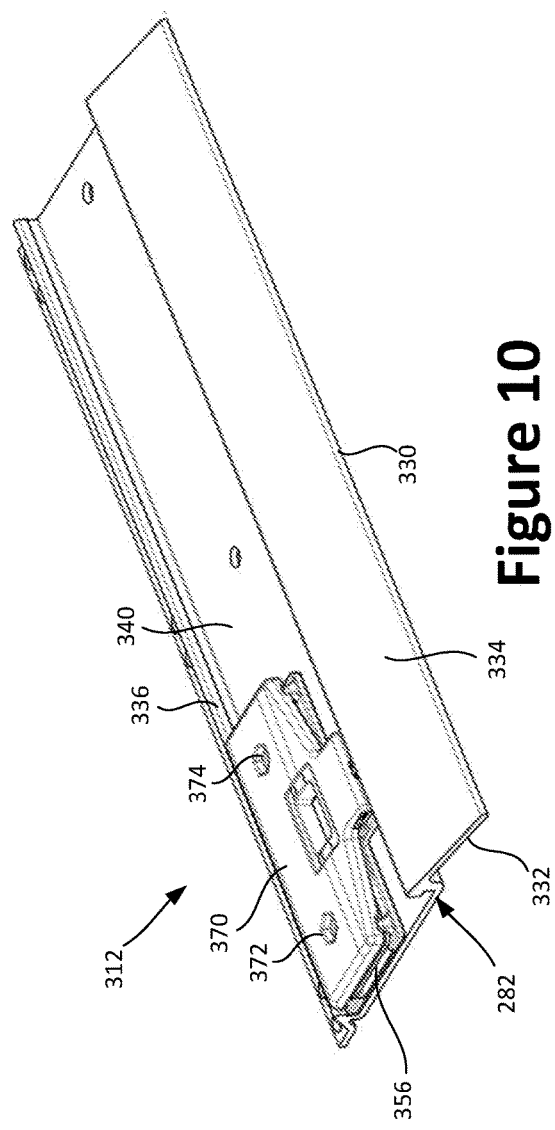
FIGS. 10 and 11 are perspective views of the embodiment of the sensor tray shown in FIG. 7 including the weight sensor of FIGS. 7 and 8.
Figure 11:
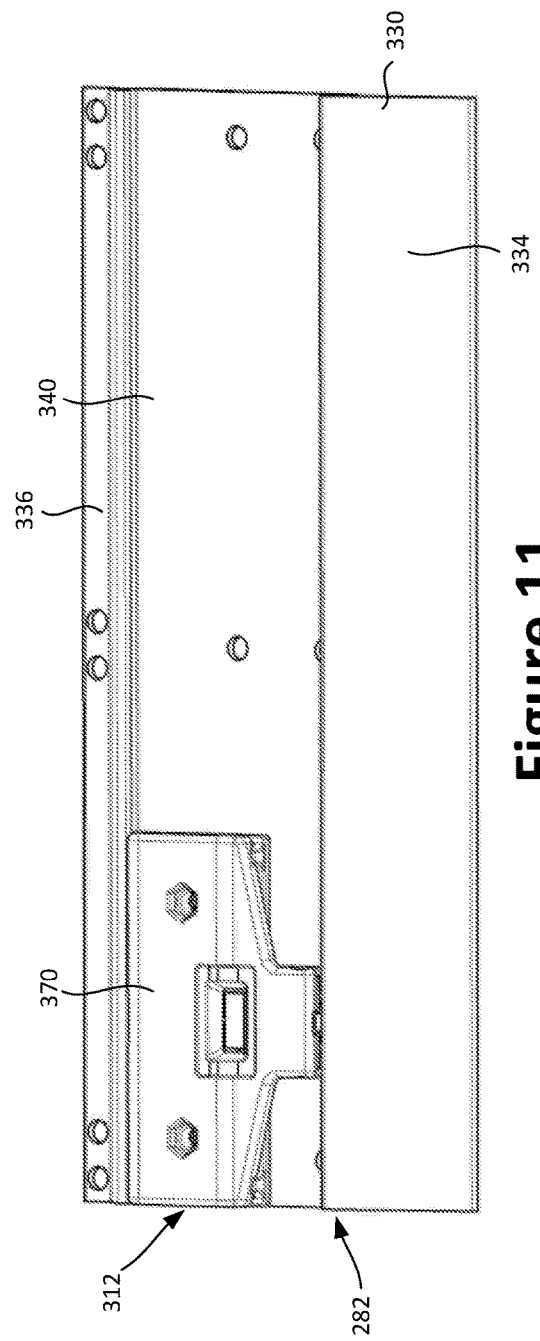

FIG. 6 is a schematic diagram of an embodiment of product rack 280, including vertical supports 302 connected to transverse supports 304. Example vertical supports 302 include beams and panels. As used herein, the term "vertical" is not limited to an orientation perpendicular to a floor surface but includes any angle of the vertical supports that elevates the transverse supports above the floor. Example transverse supports 304 include transverse beams and shelves. Transverse supports 304 support boxes 134. Between transverse supports 304 and boxes 134 are sensor trays 282 including weight sensors 312, which are examples of sensors 136, and communication and power cables 314 connecting weight sensors 312 in a daisy-chain arrangement between front end and back end terminal boxes 316, 318. A communication and power cable 320 extends from front end terminal box 318 and is communicatively coupled with fuel station controller 40 or product controller 40A to monitor dispensing of fluids from boxes 134. Communication and power cables 314 comprise wired communications channel 286. Terminal box 316 may comprise wireless node 290, in which case communication cable 320 is not required.

In one example, weight sensors 312 are communicatively coupled using an RS-485 serial communications protocol. Each weight sensor 312 has a unique address, configurable with a DIP switch 390 (shown in FIG. 9), and can transmit, using an RS-485 controller in weight sensor 312 (not shown), an indication of a sensed weight when pooled by an RS-485 master controller (not shown). Accordingly, a controller connected to communication cable 320 and including an RS-485 master controller can obtain the weights sensed by each of the daisy-chained weight sensors 312. Of course, other serial communication protocols can be used, or as described previously, wireless transceivers can be used instead of RS-485 controllers on each weight sensor 312. Weight sensors 312 are hot-swappable, meaning that a sensor can be removed and replaced without disconnecting the power.

As described further below, an advantage of using sensor trays 282 is that weight sensors 312 can be translated within each tray to accommodate different box widths. For example, boxes A are wider than boxes B, C, or D, therefore corresponding weight sensors 312 are spread further apart than if the boxes were narrower or were spaced closer together. Furthermore, if a weight sensor 312 must be replaced, the tray configuration enables replacement without removal of adjacent weight sensors.

FIGS. 7-11 are views of an example of an embodiment of a weight sensor 312 positioned in a sensor tray 282. Sensor tray 282 includes a front end 330 having a base surface 332 and a top surface 334, a back end 336, and a channel 340 between front end 330 and back end 336. Channel 340 includes a base surface 342 on which lays weight sensor 312, a front surface 344, a front channel 348, and a back surface 346. In the present embodiment, a back channel is also provided. The front end of weight sensor 312 is wedged in channel 348. A biasing feature, e.g. flexible tube 349, provides a retaining force against weight sensor 312 to keep the back end of the sensor in the back channel. An arcuate surface extends below base surface 342 to provide space for the biasing feature. As used herein, front refers to the end of sensor tray 282 from which a box is moved into position on product rack 280, and back refers to the end opposite the front end. Generally, a plane passing through the front and back ends is perpendicular to the length of sensor tray 282. Top surface 334 in angled to facilitate sliding of boxes over sensor tray 282 into position in the rack.

Weight sensor 312 includes a base 350 supporting load cells 354, 356 and a circuit board assembly 352. Circuit board assembly 352 includes a processor 392 (shown in FIG. 9) electrically coupled to a pair of communication connectors 358, 360 configured to electrically couple communication cables 314 to form the daisy-chain of weight sensors 312. Circuit board assembly 352 also supports a power supply to supply processor 392, analog front-end circuitry to receive signals from load cells 354, 356 and condition the signals for processor 392. Processor 392 has an on-board analog-to-digital converter. Conductors 380, 286 electrically connect load cell connectors 382, 384 to load cells 354, 356. Load cell connectors 382, 384 on circuit board assembly 352 are connected via the analog front-end circuitry to processor 392. Processor 392 communicates the weight signals over the RS-485 channel when requested by the product controller over the RS-485 channel in a manner that is well known in the art. Weight sensor 312 also includes a weight plate 370 which is cantilevered and supported by weight cells 354, 356. When the front end of a box lays on weight plate 370, the weight of the box is sensed by weight cells 354, 356. The terms front and back are relative, as described above. A couple of support studs 372, 374 are provided to maintain weight plate 370 in place in a known manner. Base 350 includes clips 362, 364, 365 configured to permit circuit board assembly 352 and load cells 354, 356, to snap into place.

Figure 12:
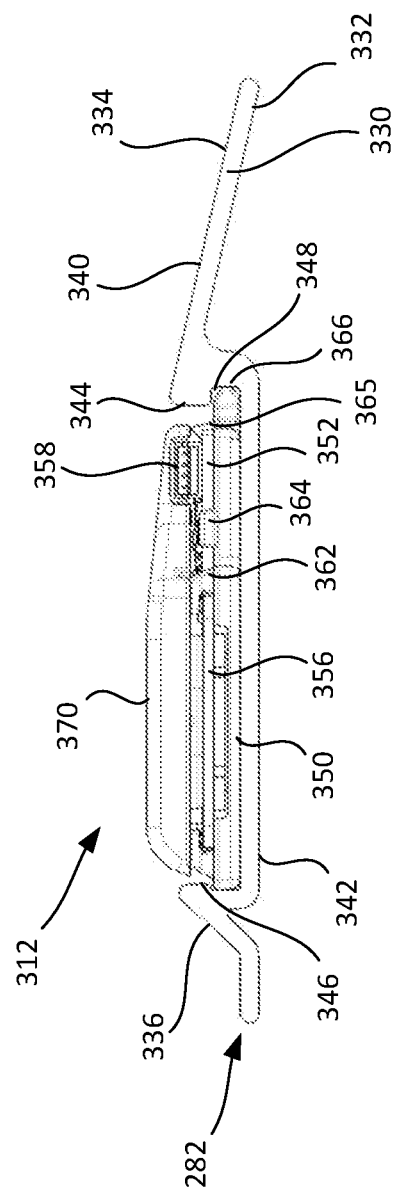
FIG. 12 is an elevation view of another example of the embodiment of the weight sensor and sensor tray depicted in FIG. 7.

FIG. 12 depicts another example of the embodiment of weight sensor 312 positioned in sensor tray 282. In the present example base 350 of weight sensor 312 comprises a biasing feature in the form of a chamfered tip 366 configured to deform when weight sensor 312 snaps into channel 340, at which time tip 336 snaps into channel 348 and the opposite end of base 350 is pressed into the back channel.

Figure 13:
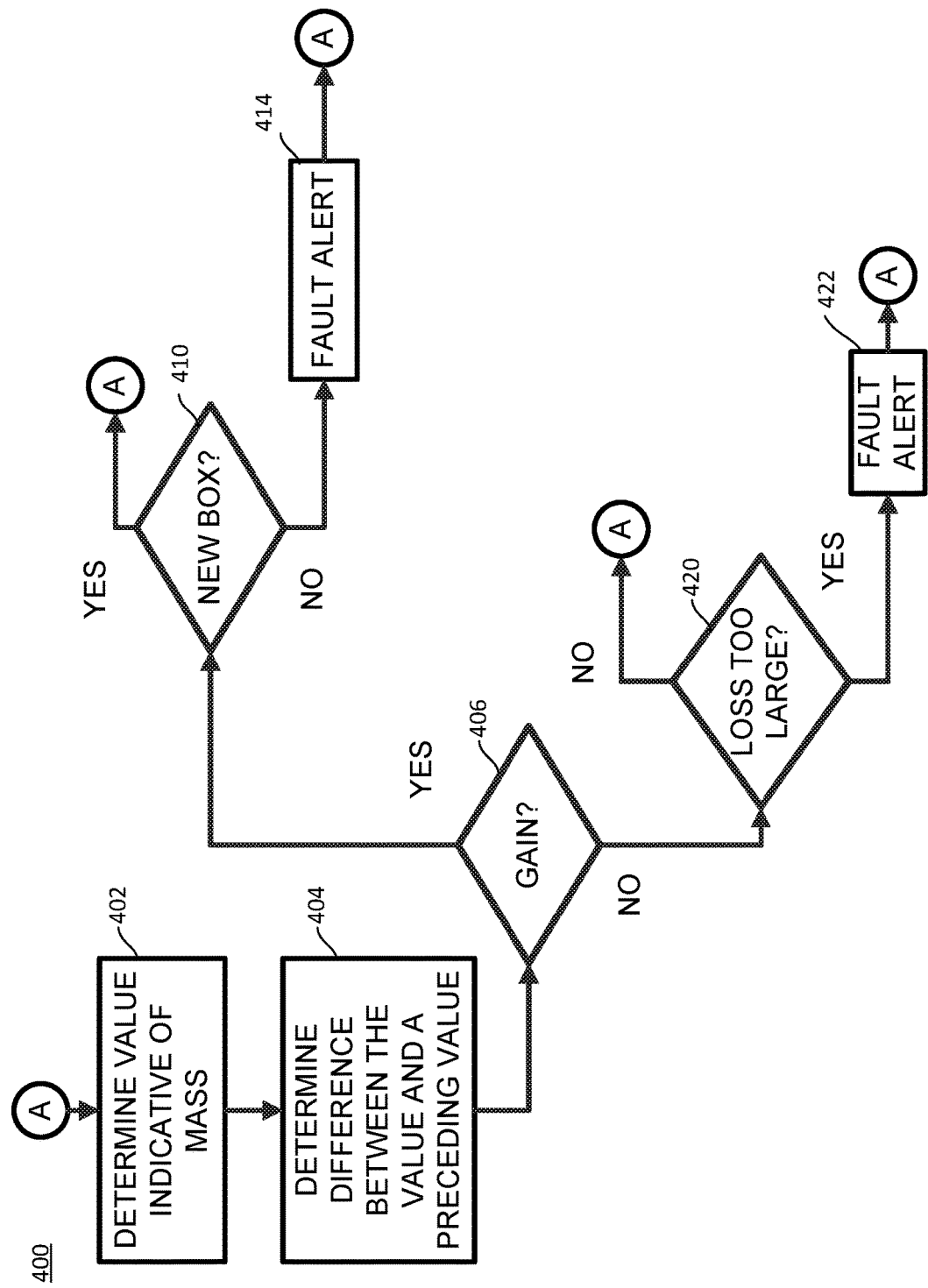
FIG. 13 is a flowchart of an embodiment of a fluid monitoring and alert method.

Referring now to FIG. 13, a flowchart 400 of an embodiment of a product monitoring and alert method is provided. The method begins by determining, at 402, a value indicative of mass. The value may be the weight of the box sensed by a respective weight sensor 312. The method may be applied sequentially to each of the weight sensors to determine the status of the respective boxes. The values are stored in memory. The values may be averaged a few times over a period of a second to account for sensor noise and variation. A preceding value stored in memory is used to determine changes and faults. The preceding value may be the immediately preceding value obtained a predetermined time prior to the present value. For example, the present and preceding values may be obtained one or more minutes apart in time. The predetermined time can be set to reflect the desired response of the system.

The method continues by determining, at 404, a difference between the present and preceding values, and thereafter by determining, at 406, if the difference is positive, reflecting a weight gain, or negative, reflecting a weight loss. If weight increased, the method continues, at 410, when the weight gain is compared to the weight of a new box, and if the weight gain is sufficiently large to represent a new box, the method continues. If the weight gain is insufficiently large, the weight gain may indicate that an object was placed on the box. In such case a fault alert may be sent, at 414. The amount of weight gain may be monitored to detect when the weight is removed.

If no gain is sensed (meaning no change or decrease), the method continues, at 420, by determining of the weight loss is larger than expected, e.g. larger than the weight of liquid needed to fill a standard drink. If so, at 422 a fault alert may be sent to notify an attendant of a potential leakage fault. Thresholds may be set to determine the expected serving of product and thus identify a leakage fault, or to identify a changed box.

Figure 14:
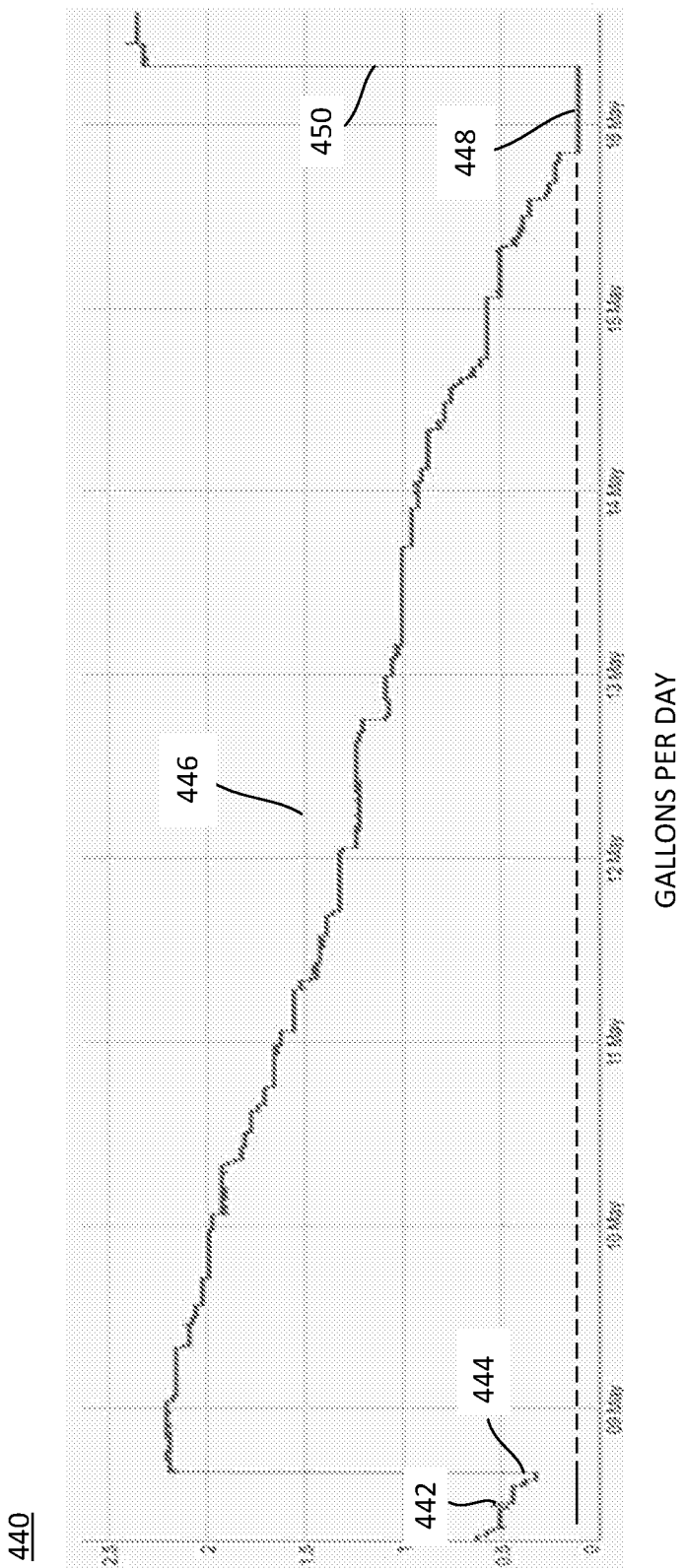
FIGS. 14 and 15 are graphs illustrating operation of an example of the embodiment of the fluid monitoring and alert method of FIG. 13.
Figure 15:
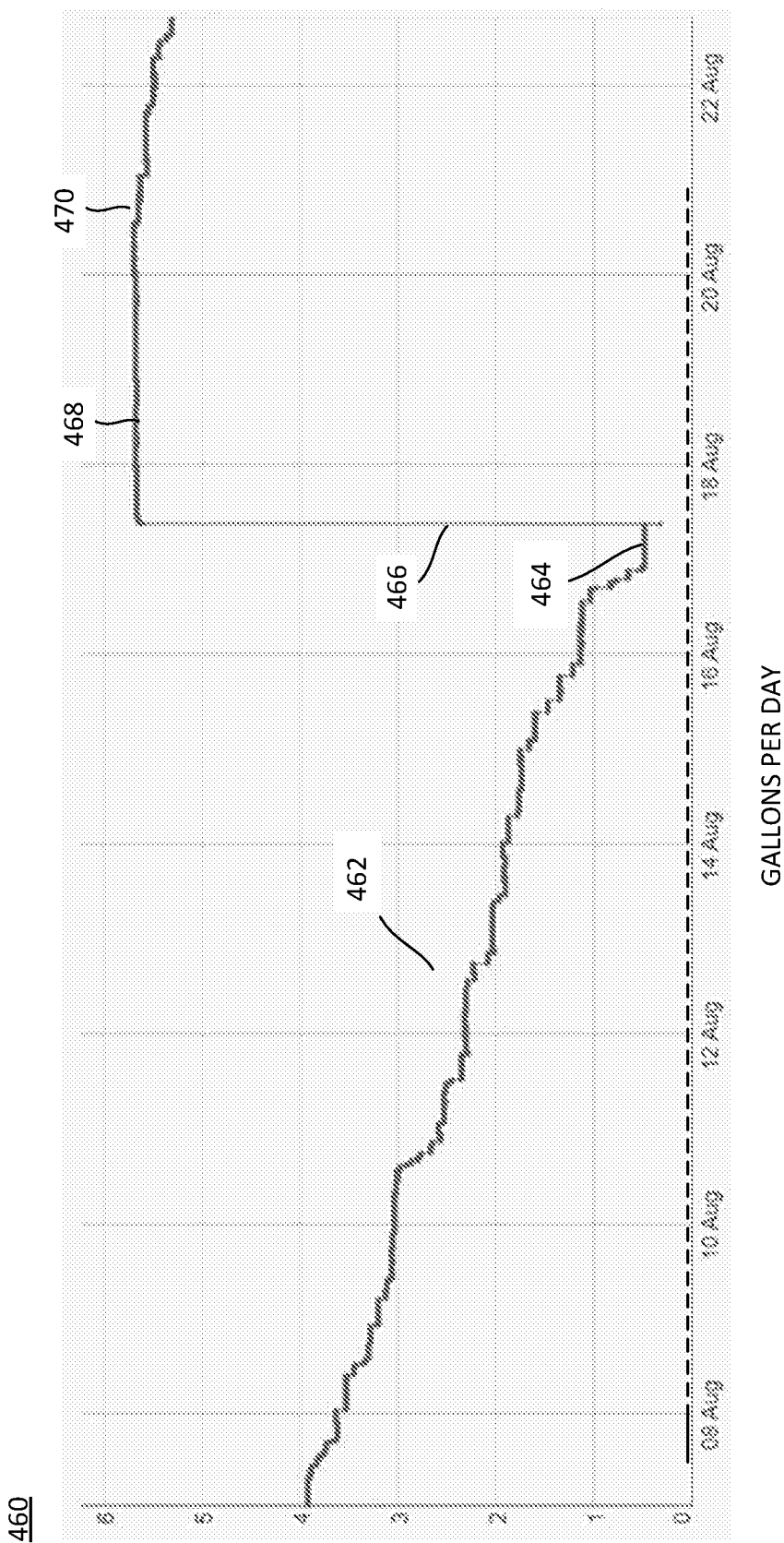

Referring now to FIGS. 14 and 15, another embodiment of a product monitoring method will be described with reference to graph 440 and 460, illustrating performance of the method, and with reference to a flowchart 500 of the method, presented in FIG. 16. Graph 440 illustrates normal usage (442), efficient replacement of a box (444), normal usage (446), short outage (448), and a box replacement after the short outage (450). Graph 460 illustrates normal usage (462), a short period of no usage (464) with volume being low, a box replacement (466), and a period of no usage (468) possibly indicative of an out-of-use sign on the machine or incorrect installation of the box just replaced, followed by resumption of normal usage normal usage (470).

Figure 16:
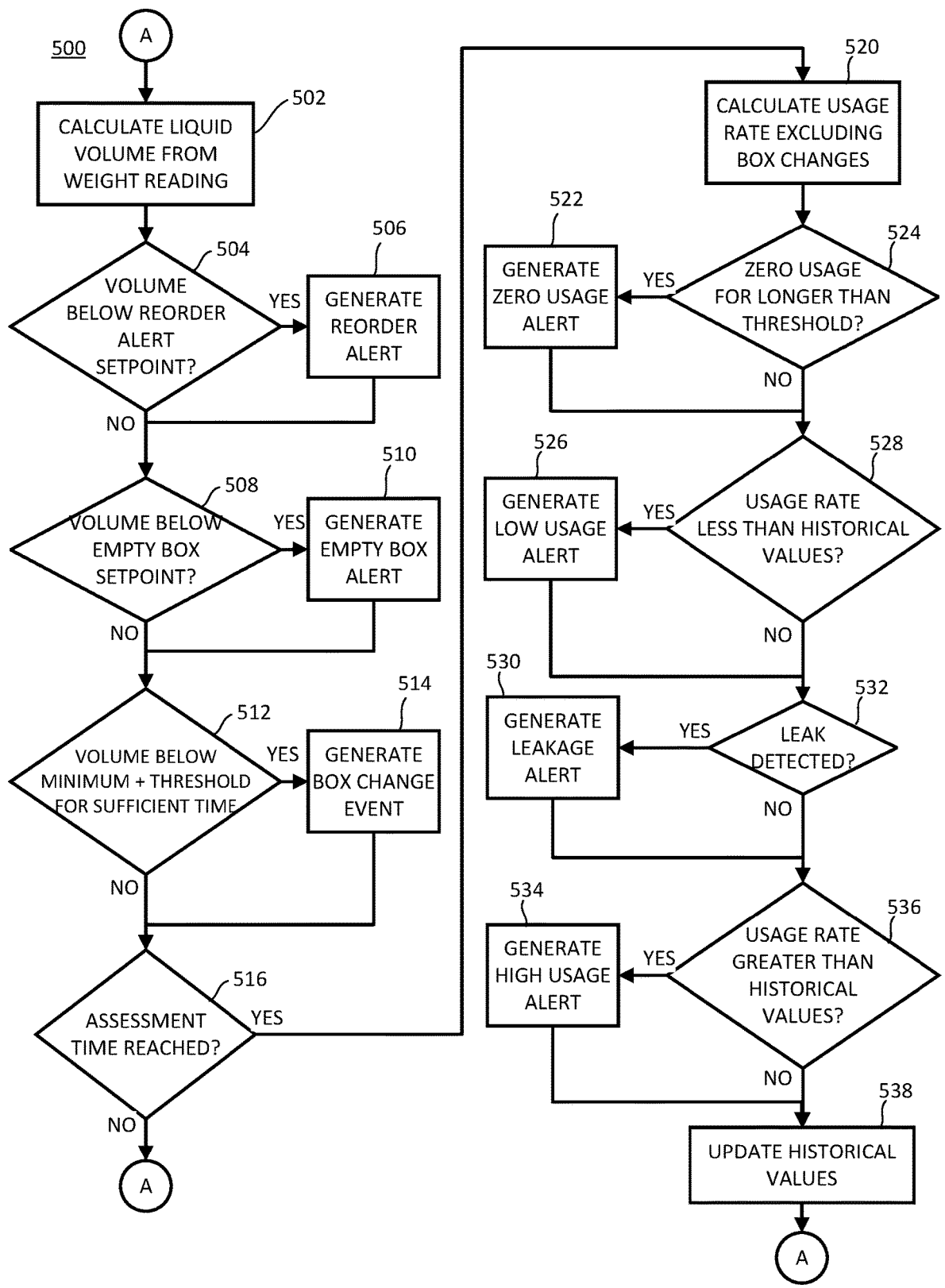
FIG. 16 is a flowchart of another example of the embodiment of a fluid monitoring and alert method illustrated by the graphs depicted in FIGS. 14 and 15.

Referring to FIG. 16, the method begins at 502, calculating liquid volume from weight readings from a weight sensor, e.g. sensor 312. It should be understood that the method could be performed based on weights as well, without conversion to liquid volume. 504-514 are concerned with inventory management and generating alerts to mitigate the risk of running out of product. At 504 the volume is compared to a reorder alert setpoint, and if the volume is less than the setpoint, a reorder alert is generated at 506. If the volume is greater than the setpoint, the method continues by comparing the volume to an empty box setpoint, at 508, and if the volume is less than the setpoint, an empty box alert is generated at 510. If the volume is greater than the setpoint, the method continues, at 512, by comparing the volume to a minimum volume plus a box change threshold, calculated to prevent that the box will become empty, thus limiting product sales. The threshold can be based on average usage and, for example, an amount of time required to retrieve a box from storage and replace it on the rack. If the volume was less than the minimum plus the threshold for sufficient time (box change threshold), a box change event alert is generated, at 514.

Referring to FIG. 14, a box change event alert was generated which resulted, at 444, in a box being changed after normal product usage reduced the volume to about 0.3 gallons above an empty weight (dashed) line. In this example the box change threshold (minimum+threshold for sufficient time) would be at least 0.3 gallons (assuming instantaneous box change is possible) or greater, which would allow for some usage while a box is retrieved and changed, resulting in a change at about 0.3 gallons. Still referring to FIG. 14, a normal usage trend 446 shows that the new box contained about 2.2 gallons of product, and the product usage continued until the box became empty, triggering the empty box alert. The box remained empty, at 448, for about a day, which is an undesirable event. Afterward the box was changed, at 450. The box change event alert prevented the box from becoming empty, avoiding the undesirable loss of sales.

Referring to FIG. 15, a box change event alert was generated which resulted, at 464, in a box being changed after normal product usage reduced the volume to about 0.5 gallons above an empty weight (dashed) line. After the box change there was no usage, at 468, for over two days, therefore an low usage alert was triggered. Usage continued at 470.

Referring again to FIG. 16, once the various setpoints/threshold are compared to the volume, a time elapsed is compared to an assessment time to determine if it is time to recalculate usage parameters. The assessment time can be set to recalibrate the process more slowly or quickly. 520-538 are primarily concerned with usage trends. After the assessment time is reached, the method continues, at 520, by calculating usage rates (or usage), for example average usage per box. The usage rate can include a short term and a longer term, or historical, usage. If usage is zero or meaningfully less than the smallest product serving for longer than a predetermined (threshold) time, at 524 the process generates a zero usage alert, at 522. The zero usage alert could be indicative of a problem with the connection of the box or perhaps a sign indicating the customers that the drink dispenser is out of service. Thus, the zero usage alert would alert an operator to inspect the machine to resume usage. If usage is not zero or is zero for less than the threshold, the process determines, at 528, if usage is less than a historical value. If usage is less than the historical value, at 526 a low usage alert is generated.

At 532 the process evaluates whether a leak has been detected. A leak may be detected if weight decreases substantially continuously vis a vis in a step-wise manner corresponding to servings. If a leak is detected, a leakage alert is generated at 530.

At 536 the process determines, at 536, if usage is greater than the historical value. If usage is greater than the historical value, at 534 a high usage alert is generated. A store operator can then consider whether to increase the minimum order quantity or to place additional orders for boxes to satisfy the increased demand. The historical usage value is then updated, at 538, to reflect the low or high usage. It can be seen by reviewing the vertical scales that graph 440 represents a lower usage than graph 460. Additionally, the steps in the methods depicted in FIGS. 13 and 16 can be performed in different order, and one or more steps may be omitted.

The scope of the invention is to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The embodiments and examples described above may be further modified within the spirit and scope of this disclosure. This application covers any variations, uses, or adaptations of the invention within the scope of the claims.

What is claimed is:

1. A fuel station controller operable to dispense fuel and drinks, the controller comprising:
    a housing comprising a partition defining a fueling module space on one side of the partition and a non-fueling module space on an opposite side of the partition, the partition providing electrical isolation between the fueling module space and the non-fueling module space;
    fueling modules having connectors exposed to the fueling module space, the connectors of the fueling modules adapted to connect conductors from a fuel dispenser; and
    product modules having connectors exposed to the non-fueling module space, the connectors of the product modules adapted to connect conductors from an ingestible product dispenser,
    wherein the controller is communicatively coupled with the fueling modules and the product modules and comprises processing instructions operable to receive a value indicative of a quantity of an ingestible product in a box to be dispensed by the ingestible product dispenser and to generate an empty box alert if the value is below an empty box setpoint.

2. The fuel station controller of claim 1, wherein the processing instructions are operable to generate a reorder alert if the value is less than a reorder alert setpoint.

3. The fuel station controller of claim 1, wherein the processing instructions are operable to generate a zero usage alert if the value is indicative of zero usage for a period longer than a zero usage threshold.

4. The fuel station controller of claim 1, wherein the processing instructions are operable to average the value over a period of time to determine a historical usage rate.

5. The fuel station controller of claim 4, wherein the processing instructions are operable to calculate a usage rate based on an average of the value and to generate a low usage alert if the usage rate is less than the historical usage rate.

6. The fuel station controller of claim 4, wherein the processing instructions are operable to calculate a usage rate based on an average of the value and to generate a high usage alert if the usage rate is greater than the historical usage rate.

7. A fuel station comprising:
    fuel storage tanks;
    a fuel dispenser;
    fuel pumps structured to pump fuel from the fuel storage tanks though the fuel dispenser;
    a fuel station controller operable to control the fuel pumps; and
    a retail store including a sensor configured to generate a signal representative of a quantity of an ingestible product held in a box, and a data display,
    wherein the fuel station controller comprises processing instructions operable to determine a quantity value of the ingestible product based on the signal from the sensor, to determine whether the quantity value is less than a first low level limit or a second low level limit, if the quantity value is less than the first low level limit and an inventory quantity of boxes comprising the ingestible product is less than a minimum quantity, then to initiate a reorder alert, and if the quantity value is less than the second low level limit and the inventory quantity is greater than zero, then to initiate a change box alert.

8. The fuel station of claim 7, wherein the change box alert comprises a local notification alert presented on the data display.

9. The fuel station of claim 7, wherein the reorder alert comprises a remote notification alert transmitted to a supplier of the product or to a remote controller associated with the fueling station.

10. The fuel station of claim 7, wherein the fuel station controller is programmable with the first low level limit and the second low level limit.

11. The fuel station of claim 10, wherein the fuel station controller processing instructions are operable to automatically program the first low level limit and the second low level limit dynamically based on a time of day and a day of week.

12. The fuel station of claim 11, wherein the fuel station controller processing instructions are operable to automatically program the first low level limit dynamically based on the time of day, the day of week, and a usage history.

13. The fuel station of claim 7, further comprising a box sensor configured to generate signals representative of box information of the box, the box information including an expiration date, wherein the processing instructions are further configured to issue a replacement command when a current date is within a predetermined number of days from the expiration date.

14. The fuel station of claim 7, further comprising a frozen carbonated beverage (FCB) machine, wherein the processing instructions are further configured to prevent operation of the FCB machine upon determining that a box fluidly connected to the FCB machine is empty.

15. The fuel station of claim 7, further comprising a beverage dispenser and a valve fluidly connecting two boxes, wherein one box is fluidly connected to the beverage dispenser, and wherein the processing instructions are further configured to determine when the one box is empty and to operate the valve to fluidly connect the other of the two boxes to the beverage dispenser.

16. The fuel station of claim 15, wherein the processing instructions are further configured to generate a box replacement indication upon determining that the one box is empty.

17. The fuel station of claim 7, wherein the processing instructions are further configured to calculate a statistical parameter representative of a difference in fluid line pressure sensed when dispensing from prior boxes and a currently used box, and to indicate a fault if the statistical parameter exceeds a threshold.

* * * * *